US 6,735,725 B1

United States Patent
Wu et al.

(10) Patent No.: US 6,735,725 B1
(45) Date of Patent: May 11, 2004

(54) METHOD AND APPARATUS FOR PERFORMANCE MANAGEMENT OF A MULTIPLEXED TRANSMISSION SYSTEM

(75) Inventors: Chung Y. Wu, Kanata (CA); Ping W. Wan, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 369 days.

(21) Appl. No.: 09/672,789

(22) Filed: Sep. 29, 2000

(51) Int. Cl.$^7$ .................. G06F 11/00; H03M 13/00
(52) U.S. Cl. ............................. 714/704; 714/752
(58) Field of Search .................. 714/704, 708, 714/752

(56) References Cited

U.S. PATENT DOCUMENTS

| 5,225,922 A | | 7/1993 | Chraplyvy et al. ......... 359/124 |
| 5,546,411 A | * | 8/1996 | Leitch et al. ............... 714/708 |
| 5,606,725 A | * | 2/1997 | Hart ........................... 725/131 |
| 5,621,737 A | * | 4/1997 | Bucher ....................... 714/704 |
| 5,722,051 A | * | 2/1998 | Agrawal et al. ............. 455/69 |
| 5,751,702 A | * | 5/1998 | Evans et al. ................ 370/314 |
| 5,768,684 A | * | 6/1998 | Grubb et al. ............... 455/13.4 |
| 5,878,329 A | * | 3/1999 | Mallinckrodt ............... 455/69 |
| 6,160,443 A | * | 12/2000 | Maalej et al. .............. 329/304 |

FOREIGN PATENT DOCUMENTS

| EP | 0926854 | | 12/1998 | ............ H04J/14/02 |
| EP | 926854 A2 | * | 6/1999 | ............ H04J/14/02 |

* cited by examiner

*Primary Examiner*—Albert Decady
*Assistant Examiner*—Joseph D Torres (57) ABSTRACT

A method and apparatus for performing optical channel performance management on a WDM system while in operation is disclosed in which each transmitter and receiver uses forward error-correction schemes to improve the BER performance of the channel in a known relation to the performance before error-correction. The receiver measures the BER performance before error-correction in real-time and communicates it to a system manager which determines, from this data, the appropriate launch power of each transmitter in the system, which it commands each transmitter to adopt, thereby ensuring relative launch powers which optimize the overall BER performance of the WDM multiplexed signal.

4 Claims, 3 Drawing Sheets

METHOD AND APPARATUS FOR PERFORMANCE MANAGEMENT OF A MULTIPLEXED TRANSMISSION SYSTEM

FIELD OF THE INVENTION

This invention relates to a method and apparatus for performance management in a multiplexed transmission system, particularly but not exclusively an optical transmission system.

BACKGROUND OF THE INVENTION

The demand for high speed and high capacity data transmissions has been rising. In long haul transport, as well as in metro ring applications, the use of dense wavelength-division-multiplexing (DWDM) or wavelength-division-multiplexing (WDM)allows for increases in the transmission bandwidth by two, three or more times.

DWDM, or equivalently, for the purposes of this specification, WDM, systems permit a number of signals to be carried along a single optical fiber by modulating each signal about a separate optical carrier wavelength. Typically, optical routing and signal regeneration are performed by passive and active optical elements.

DWDM optical fiber telecommunication systems can have extremely high overall data capacity since each channel is capable of carrying a high data rate signal. These high capacity signals can be carried cost-effectively over many hundreds of kilometers if Erbium Doped Fiber Amplifiers (EDFA) are used to boost the power of the optical signal periodically and overcome the loss incurred in the optical fiber and the passive optical elements. There is a growing requirement to increase the capacity of the existing communication systems.

While optical amplifiers are designed to produce a linear gain profile, as a practical matter, the wavelength dependent profile of EDFAs and other optical elements in the network is non-uniform, so that this objective cannot always be reached across the entire wavelength range over which signals will be transmitted. A significant challenge in carrying such multi-channel signals over many spans of fiber separated by boosting EDFAS has to do with the fact that the wavelength spectrum of the gain of the EDFAs is not flat. In fact, because of the physical properties of the Erbium ions that provide the gain, the shape of the gain spectrum changes from strong gain (about 23.5 dB at 1530 nm) to weak gain (about 21.5 dB at 1560 nm). The fiber span also shows non-uniform loss across the wavelength spectrum. Generally, the higher the wavelength, the higher the loss.

Moreover, even with a gain flattening filter, the gain profile of an optical amplifier across the wavelength range still shows ripple and gain tilt. The ripple (the slight variation in the gain) and tilt (the slope of the gain profile) are functions of input power and are intrinsic properties of the amplifier material.

Further, due to aging amplifiers and environmental factors, optical signal quality could degrade, resulting in a degradation of the system performance over time.

In a long multi-span cascade of fiber spans and EDFA line-amplifiers, the nominal gain of the EDFA is set equal to the span loss, so that a nominal channel does not rise or fall in power as it propagates downstream. This non-ideal gain (due to EDFAs) and loss (due to fiber and component lose) spectrum means that in a long multi-span cascade of fiber spans and EDFA line-amplifiers, some channels will have more gain or higher loss than the average and will grow in relative power as the multi-channel signal propagates down the link. However, some channels have less gain or lower loss than the average, and so the power of that channel will decrease as the multi-channel signal propagates down the link.

The non-linear nature of the overall gain or loss profile has a profound impact on the bit error rate (BER) of the optical link.

The amount of gain provided by an EDFA is controlled by the amount of pump laser power that is applied to the Erbium doped fiber, and typically covers a range of 15 dB to 35 dB. The amount of output power capability of the EDFA is also influenced by the amount of pump laser power. For any given amount of pump power, there is a certain limit to the total power over all of the channels, with 15 dBm as an example of a typical value. This is a natural physical limit at which the pump photon flux is just sufficient to replenish the depletion of the Erbium population inversion by the high signal output power. As well as this natural physical limit on the total power capability, there can also be an additional lower limit applied by design. For a given number of channels, it might be useful to limit the total power out of the EDFA and launched into the optical fiber in order to avoid certain nonlinearities in the fiber. This total power control (TPC) mode typically is implemented by tapping off a very small but controlled fraction of the light at the output of the EDFA and monitoring that with a photodetector.

Since all of the wavelength channels can carry revenue generating traffic, it is of interest to ensure that all of the channels meet a certain standard of performance. In a digital system, BER is typically used as a figure of merit, and $10^{-12}$ is a common objective for BER. One of the main influences which will degrade the BER of multi-span EDFA links is the noise known as the Amplified Spontaneous Emission (ASE) which is generated inside the EDFAS. The amount of total noise (ASE, signal-to-spontaneous beat noise, spontaneous-to-spontaneous noise, etc.) relative to the signal power is typically quantified by the Optical Signal to Noise Ratio (OSNR), defined as:

$$OSNR = \text{Signal Power}/(\text{noise density} * BW_{OSNR}) \quad (1)$$

where $BW_{OSNR}$ is the spectral band over which the OSNR is defined (for example 0.1 nanometers).

To optimize the OSNR of any given channel in a multi-span link, the input powers to each EDFA should be kept as high as possible at all of the amplifiers. This influences the design of multi-channel links where some channels will be increasing in power going down span, and some channels will be decreasing in power. The simplest case to consider is one in which all of the channels are initially launched at the same power. In the case of a channel which has more than average EDFA gain, it increases in power after that initial launch point, up until the receiver. With such high powers going into the EDFAs, that channel will have a good OSNR and will then have a good BER, provided that fiber nonlinearities are not provoked. However, a channel which has less than average gain will drop in power at every span as it propagates down-link. This channel will have a poor OSNR and thereby will have a high BER, which may not meet an objective like $10^{-12}$.

At first, it might be thought that the simplest way to ensure that the weak channels do not severely hamper the system would simply be to turn all transmitters up to their highest launched power achievable. However, constraints (either natural or by design) on the total power available from the EDFA rule out this simple approach. Given that the total EDFA power is limited, the solution in the past has traditionally been to turn up all transmitters only by the appropriate amount such that the end performance (either OSNR or BER) is balanced between all channels. If any transmitters were launching more than the power necessary to achieve this balanced performance condition, then they would necessarily be taking more power than they need from at least one of the EDFAs. Because of the constraint on total EDFA power, this removal of power would then reduce the power available to the weaker channels. This means that the performance of the weaker channels would suffer if the strong channels were allowed to get better end performance than the average. In conclusion, when operating under total power constraints, adjusting the channel launched power of the transmitters to achieve equalization of the end performance of all of the channels is the optimum solution.

Therefore, it is important to have a method to adjust the launching power of the channels in order to equalize the BER performance of all the channels. Since aging and optical degradation happens over time, it is important to develop the equalization method so it can be used during the operation of the network and not simply during system set up.

One solution to this problem would be to physically measure the BER value generated at a receiver and use this information to adjust the launching power of all the channels to provide equal output BER. Such an approach, has not been heretofore practical, however, because of the long monitoring times that would be required in order to calculate the receiver BER, for BER values representative of a channel with any practical value.

Another solution to this problem would be to determine the OSNR values corresponding to each DWDM channel of the DWDM signal being received at a DWDM receiver and to subsequently attenuate the input power of the DWDM channels with high OSNR at the transmitter prior to multiplexing the channels.

In U.S. Pat. No. 5,225,922, (Chraplyvy et al.) issued Jul. 6, 1993 to AT&T Bell Laboratories entitled "Optical Transmission System Equalizer", the OSNRs at the output of an amplified WDM system are measured directly and the input powers are iteratively adjusted to achieve equal OSNRs.

However OSNR values alone do not accurately characterize the system performance. Rather, OSNR is only one of several parameters that affect the performance of an optical transmission system, which by definition, is fully expressed by the BER.

In European published Patent Application No. EP 0926 854 A2 (Barnard et al,) laid-open for publication on Jun. 30, 1999 and entitled "Methods for Equalizing WDM Systems", there is disclosed a method of equalizing the channels of a WDM link by identifying for each optical channel in the link an error threshold level for the BER of the optical channel and the attenuation of the channel's power along the link and then adjusting the input powers of the weaker channels in accordance with the measured attenuations of all of the channels to obtain substantially equal BER for all of the channels.

With both of these approaches, however, the system is unable to operate while data is being sent on the network since both of these algorithms must at times make sure channels are accessible (i.e. taken off service) in order to determine constants used within the attenuation calculations.

SUMMARY OF THE PRESENT INVENTION

Accordingly, it is desirable to provide an improved method and apparatus for optical channel performance management.

It is further desirable to provide a method and apparatus for optical channel performance management that can be implemented while the system is in operation.

The present invention accomplishes these aims by providing a forward error correcting (FEC) element within a WDM receiver, which provides as an output, a signal having a BER which provides an improvement over the BER of the signal provided at its input in a known relationship. As a result, the BER at the input is sufficiently large that it can be measured and used for performance management purposes in real-time while maintaining the low BER performance required for practical operation of a WDM system.

According to a broad aspect of an embodiment of the present invention, there is disclosed a method of equalizing the performance of a plurality of multiplexed transmission channels comprising: encoding signals for transmission in the channels using a forward error-correcting code; receiving the encoded signals; determining the BERu (bit error rate prior to forward error correction) of each of the received signals; decoding the received signals using the forward error-correcting code to retrieve output data signals; and adjusting the transmission powers of the channels according to the determined BERu for each channel thereby to equalize the $BER_u$ across the channels.

According to a second broad aspect of an embodiment of the present invention, there is disclosed a communications system comprising at least two transmitters for transmitting respective signals to respective receivers in a multiplexed signal across a communications channel, the transmitters and receivers respectively coding and decoding their respective signals using a forward error-correcting code which provides an improvement in the BER after forward error-correcting decoding in the receiver in a known relation to the BER before forward error-correction, a system manager comprising: a status module for receiving, from the receivers in the communications system, the BER of their respective signals before forward error-correcting decoding; a calculation module for determining the relative launch power of each transmitter which will provide optimal BER performance of the multiplexed signal along the communications channel; and a command module for issuing commands to the transmitters in the communications system to adjust their launch powers in accordance with the relative launch powers determined by the calculation module.

According to a third broad aspect of an embodiment of the present invention, there is disclosed a communications system comprising a system manager and at least two transmitters for transmitting respective signals in a multiplexed signal across a communications channel, the transmitters coding their respective signals using a forward error-correcting code which provides an improvement in the BER after forward error-correcting decoding in a known relation to the BER before forward error-correction, a receiver associated with each transmitter for receiving its respective signal comprising: a decoder for decoding the received signal using the forward error-correcting code; a BER calculator for determining the BER of its respective signal before forward error-correcting decoding; and a communications module for providing the BER to the system manager; whereby the system manager may determine, from the BER values provided to it, the relative launching power of each transmitter required to optimize the BER performance of the multiplexed signal along the communications channel; and each transmitter in the communications system may adjust its launching power in response to commands from the system manager.

According to a fourth broad aspect of an embodiment of the present invention, there is disclosed a communications system comprising a system manager and at least two receivers for receiving respective signals from a multiplexed signal send across a communications channel, the receivers decoding their respective signals using a forward error-correcting code which provides an improvement in the BER after forward error-correcting decoding in a known relation to the BER before forward error-correction, a transmitter associated with each receiver for transmitting its respective signal comprising: a encoder for encoding its respective signal using the forward error-correcting code; and a launch power adjustment module for adjusting the launch power used to transmit the signal in response to commands from the system manager, whereby each receiver may determine the BER of its respective signal before forward error-correcting decoding and provide the BER value so determined to the system manager; and whereby the system manager may determine, from the BER values provided to it by each receiver, the relative launching power of each transmitter required to optimize the BER performance of the multiplexed signal along the communications channel and issue commands to each transmitter in accordance therewith.

According to a fifth broad aspect of an embodiment of the present invention, there is disclosed a computer-readable medium storing computer-executable program instructions which, when executed by a processor in a system manager in a communications system comprising at least two transmitters for transmitting respective signals to respective receivers in a multiplexed signal across a communications channel, the transmitters and receivers respectively coding and decoding their respective signals using a forward error-correcting code which provides an improvement in the BER after forward error-correcting decoding in the receiver in a known relation to the BER before forward error-correction, cause the system manager to: receive, from the receivers in the communications system, the BER of their respective signals before forward error-correcting decoding; determine the relative launch power of each transmitter which will provide optimal BER performance of the multiplexed signal along the communications channel; and issue commands to the transmitters in the communications system to adjust their launch powers in accordance with the relative launch powers determined by the calculation module.

According to a sixth broad aspect of an embodiment of the present invention, there is disclosed a computer-readable medium storing computer-executable program instructions which, when executed by a processor in a receiver in a communications system comprising a system manager and at least two transmitters for transmitting respective signals in a multiplexed signal across a communications channel, the transmitters coding their respective signals using a forward error-correcting code which provides an improvement in the BER after forward error-correcting decoding in a known relation to the BER before forward error-correction, cause the receiver, being associated with one of the transmitters for receiving its respective signal, to: decode the received signal using the forward error-correcting code; determine the BER of its respective signal before forward error-correcting decoding; and provide the BER to the system manager; whereby the system manager may determine, from the BER values provided to it, the relative launching power of each transmitter required to optimize the BER performance of the multiplexed signal along the communications channel; and each transmitter in the communications system may adjust its launching power in response to commands from the system manager.

According to a seventh broad aspect of an embodiment of the present invention, there is disclosed a computer-readable medium storing computer-executable program instructions which, when executed by a processor in a transmitter in a communications system comprising a system manager and at least two receivers for receiving respective signals from a multiplexed signal send across a communications channel, the receivers decoding their respective signals using a forward error-correcting code which provides an improvement in the BER after forward error-correcting decoding in a known relation to the BER before forward error-correction, cause the transmitter, being associated with each receiver for transmitting its respective signal, to: encode its respective signal using the forward error-correcting code; and adjust the launch power used to transmit the signal in response to commands from the system manager, whereby each receiver may determine the BER of its respective signal before forward error-correcting decoding and provide the BER value so determined to the system manager; and whereby the system manager may determine, from the BER values provided to it by each receiver, the relative launching power of each transmitter required to optimize the BER performance of the multiplexed signal along the communications channel and issue commands to each transmitter in accordance therewith.

According to a eighth broad aspect of an embodiment of the present invention, there is disclosed a method of adjusting the performance of a channel in a multiplexed transmission environment comprising: encoding signals for transmission in the channel using a forward error-correcting code; receiving the encoded signal; determining the BERu (bit error rate prior to forward error correction) of the received signal; decoding the received signal using the forward error-correcting code to retrieve the output data signal; and adjusting the transmission power of the channel according to the determined BERu for the channel thereby to establish a BERu proportionate to the relative importance of the signal to other signals in the multiplexed transmission environment.

DESCRIPTION OF THE DRAWINGS

The embodiments of the present invention will now be described by reference to the following figures, in which identical reference numerals in different figures indicate identical elements and in which.

DETAILED DESCRIPTION OF THE PREFERRED EMBODIMENTS

Figure 1:
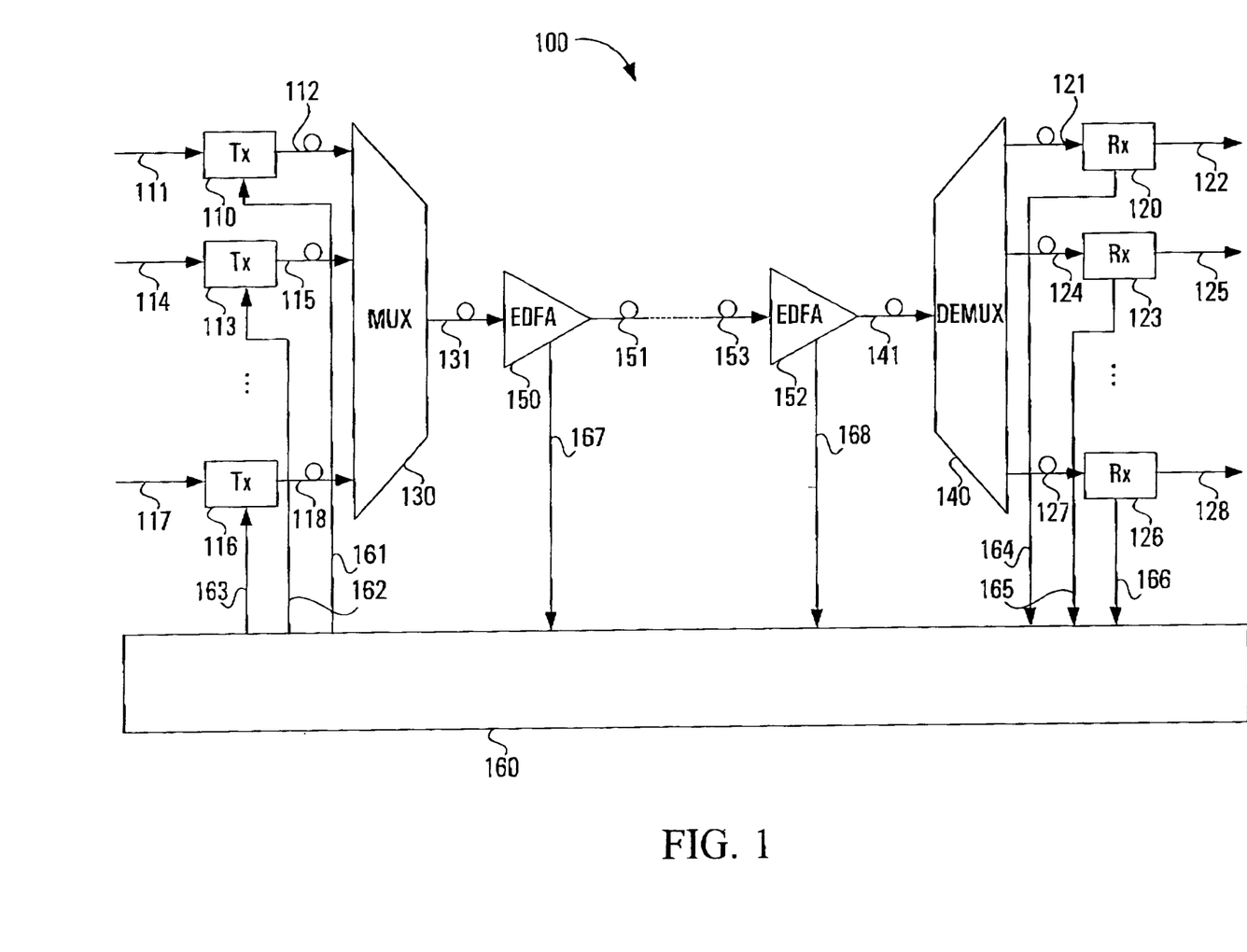
FIG. 1 is a block diagram of a WDM system in accordance with an embodiment of the present invention.

Referring now to FIG. 1, there is shown a block diagram of a WDM system, generally at 100. The WDM system 100 comprises a plurality of each of transmitters 110, 113, 116, receivers 120, 123, 126 and amplifiers 150, The WDM system 100 also comprises a system manager 160 and at least one multiplexer 130 and at least one demultiplexer 140.

Each transmitter 110, 113, 116 is connected, at its input, to an electrical cable 111, 114, 117 and at its output, to an optical fiber 112, 115, 118. (Those familiar with this art will readily recognize that, depending on the configuration of the network, incoming signals to the transmitters 110, 113, 116 may be in the optical domain rather than in the electrical domain, for example, it the transmitter 110, 113, 116 is part of a regeneration station, or if the input signal was originally transmitted along a SONET or other optical network. In such a case, the electrical cable 111, 114, 117 at the input of the transmitter 110, 113, 116 would be replaced by an optical fiber (not shown) and corresponding changes made to the structure of the transmitter 110, 113, 116.) Additionally, each transmitter 110 is connected by a control line 161–163 to the system manager 160.

The transmitter, say 110, converts an incoming data stream which arrives at its input along electrical cable 111, into a corresponding optical domain signal which it transmits at its output along optical fiber 112.

Each receiver 120, 123, 126 is connected, at its input, to an optical fiber 121, 124, 127 and at its output to an electrical cable 122, 125, 128. (Those familiar with this art will readily recognize that, depending on the configuration of the network, signals output by the receivers 120, 123, 126 may be in the optical domain rather than in the electrical domain, for example, if the receiver 120, 123, 126 is part of a regeneration station, or if the signal is to be output along a SONET or other optical network. In such a case, the electrical cable 112, 115, 118 would be replaced by an optical fiber (not shown) and corresponding changes made to the structure of the receiver 120, 123, 126.) Additionally, each receiver 120, 123, 126 is connected by a control line 164–166 to the system manager 160.

The receiver, say 120, converts an optical domain signal containing data which arrives at its input along optical fiber 121, into a corresponding data stream which it transmits at its output along electrical cable 122.

The multiplexer 130 has a plurality of inputs and a single output. It is connected, at each input, to a respective optical fiber 112, 115, 118 and, at its output, to a WDM compatible optical fiber 131.

The multiplexer 130 combines a plurality of separate optical domain signals, each containing a data stream, which arrive at its inputs, into a single WDM signal which it transmits at its output along the WDM compatible optical fiber 131. The WDM signal which it generates is comprised of each of the input data streams encoded about a separate optical wavelength.

The demultiplexer 140 has a single input and a plurality of outputs. It is connected, at its input, to a WDM compatible optical fiber 141 and, at each output, to a respective optical fiber 121, 124, 127.

The demultiplexer 140 breaks up a single WDM signal which arrives at its input, in which a plurality of data streams are each encoded about a separate optical wavelength, into a plurality of separate optical domain signals each containing one of the data streams which it transmits at its output.

The amplifier 150 has a single input and a single output. It is connected at its input to a WDM compatible optical fiber 131, connected to multiplexer 130 and at its output to a WDM compatible optical fiber 151 connected to another amplifier which may be amplifier 152.

The amplifier 152 also has a single input and a single output. It is connected at its input to a WDM compatible optical fiber 153 connected to another amplifier which may be amplifier 150, and at its output to a WDM compatible optical fiber 141 connected to demultiplexer 140. Additionally, each amplifier 150, 152 is connected by a control line 167, 168 to the system manager 160, used for purposes not related to the present invention.

Each amplifier 150, 152 accepts as an input, a WDM signal which arrives at its input and amplifies the signal, which it outputs. The amplifier 150, 152 may be an erbium-doped fiber amplifier (EDFA) which has a largely flat gain profile across the range of wavelengths used in DWDM systems.

The system manager 160 manages the operations, administrative and maintenance(OAM) functions of the WDM system 100. In this embodiment of the present invention, this includes, inter alia, functionality by which it receives performance monitoring (PM) data from the receivers 120, 123, 126 and the amplifiers 150, 152 in the WDM system 100, along control lines 164–168 respectively. The control lines 164–168 are shown for schematic purposes. Those skilled in this art will recognize that such control lines may be implemented by use of an optical service channel (OSC) carried by the optical fiber along a wavelength dedicated to this purpose. The control information carried by each of the control lines 164–168 may in fact be transmitted through the OSC data stream back to the transmitters 110, 113, 116.

As is discussed below, the performance monitoring data received by the system manager 160 includes an actual BER value calculated on a per channel basis, in real-time, from the data stream transmitted along each channel.

These BER values are compared against each other and processed to determine how, if at all, the launching power of each of the transmitters 110, 113, 116 in the WDM system 100 should be adjusted.

To the extent that adjustment is required, the system manager 160 transmits launching power adjustment data to the appropriate transmitters 110, 113, 116, along the associated control line 161–163. (The control lines 161–163 are shown for schematic purposes. As with control lines 164–168, each of control lines 161–163 may in fact be transmitted through the OSC data stream.)

In so doing, the gain of the transmitters 110 in the WDM system 100 can be adjusted relative to one another to ensure an optimal BER performance across the entire WDM system 100.

Figure 2:
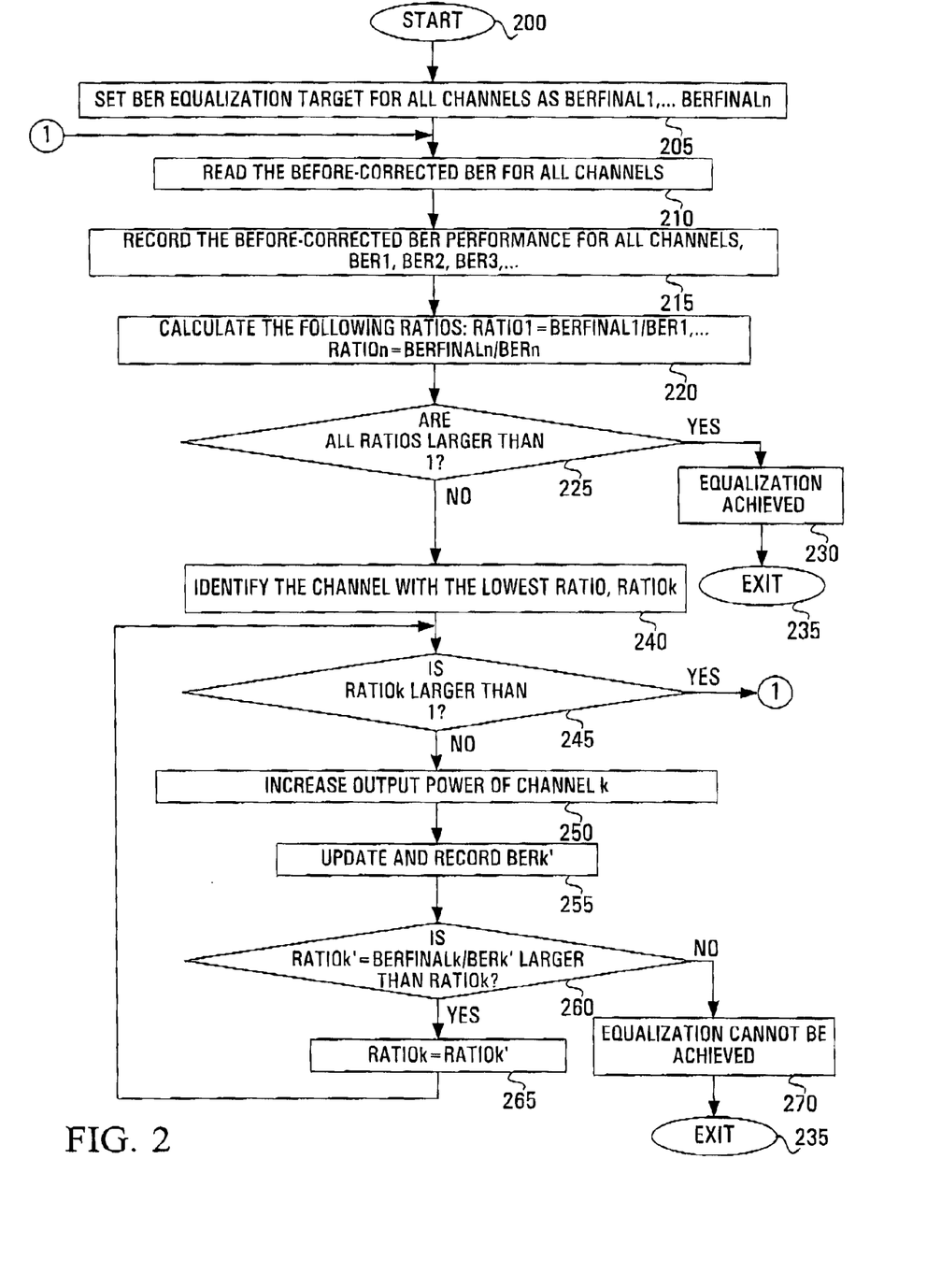
FIG. 2 is a flow chart of exemplary logic applied by the system manager in the embodiment of FIG. 1 to adjust launching power of the transmitters in the system.

Turning now to FIG. 2, a flow chart of an exemplary system for determining the launch power adjustment data to be provided to transmitters 110 in the WDM system 100 from the calculated BER values obtained from the receivers 120 is shown.

Upon start-up 200, the system manager 160 sets the equalization target for all channels to a predetermined value designated BERfinall, . . . BERfinaln 205.

The system manager 160 then obtains the BERu for each channel, which, for a channel n is denoted as BERn 215. The system manager 160 then calculates a ratio, denoted RATIOn, of the equalization target to the BERu for channel n where RATIOn equals BERfinaln/BERn 220.

The system manager 160 compares each of the ratios so calculated and determines whether they are all greater than 1 225. If so, equalization is achieved 230 and the process terminates 235. If not, the system manager identifies the channel k with the lowest RATIOk, which is accordingly the worst performing channel 240. If RATIOk is larger than 1 245, the system manager 160 reverts to step 210. Note that on the first iteration of this step, this will not take place.

If the value of RATIOk is not larger than 1, the channel output power for channel k is increased by a predetermined amount, for example 0.5 dB 250. The system manager 150 thereupon reads the BERu for channel k (BERk') 255 and calculates an updated value of RATIOk designated RATIOk' which equals BERfinalk/BERk'. The system manager 160 then compares RATIOk' to the original RATIOk value 260. If RATIOk is greater than RATIOk', than equalization cannot be achieved 270 and the process terminates 235.

However, if RATIOk' is greater than RATIOk, the RATIOk is set equal to RATIOk' 265 and the process reverts to step 245.

Figure 3:
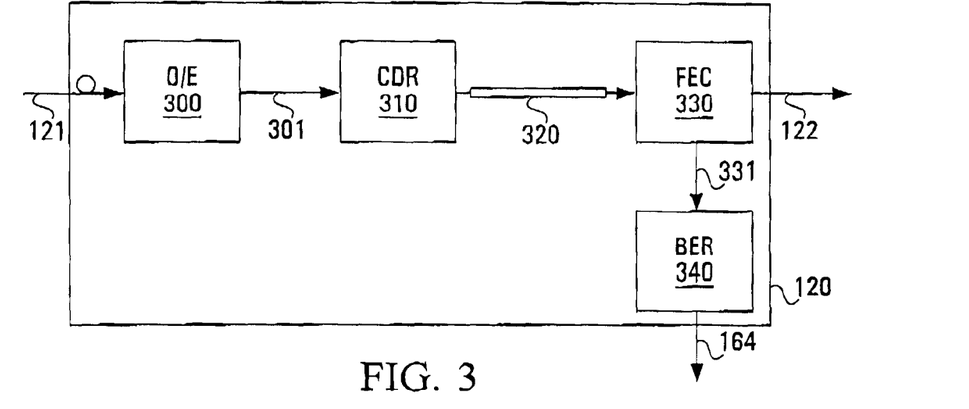
FIG. 3 is a block diagram of a receiver used in the embodiment of FIG. 1.

Turning now to FIG. 3, a block diagram of the receiver 120 used in the embodiment of the present invention is shown. The receivers 123 and 126 would have a similar structure. The receiver 120 comprises an optical to electrical converter 300, which may be a PIN detector or an avalanche photodiode, a clock and data recovery unit 310, a linear channel 320, a forward error-correcting decoding unit 330 and a BER calculation unit 340.

The optical to electrical converter 300 is connected at its input to the input optical fiber 121. It is connected at its output to the clock and data recovery unit 310 by an electrical cable 301. The optical to electrical converter 300 converts the optical domain signal arriving at the receiver 120 along the input optical fiber 121 into an electrical domain signal containing the same data, which it outputs along electrical cable 301. The function of the decoding avalanche photodiode 300 is entirely conventional.

The clock and data recovery unit 310 is connected at its input to the output of the optical to electrical converter 300 by electrical cable 301. It is connected at its output to the linear channel. The clock and data recovery unit 310 accepts the electrical domain signal from the optical to electrical converter 300 and applies processing to recover the clock signal embedded in the electrical domain signal and to clock out the data stream contained in the electrical domain signal using the recovered clock signal. The data stream is output along the linear channel 320. The function of the clock and data recovery unit 310 is entirely conventional.

The linear channel 320 is an electrical cable connected to the output of the clock and data recovery unit 310 and the input of the forward error-correcting decoding unit 330.

The forward error-correcting decoding unit 330 is connected at its input to the linear channel 320. It is connected at one of its outputs to output electrical cable 122, and at the other output to the BER calculation unit 340, by a control line 331. The forward error-correcting decoding unit 330 decodes the data stream which arrives at its input and outputs the decoded but uncorrected data stream along the electrical cable 331. The forward error-correcting decoding unit 330 applies error-correcting processing to it to correct errors which may have developed during the course of transmission of the data along the WDM system 100. The corrected data stream is output by the forward error-correcting decoding unit 320 along the electrical cable 122.

Typically, such error-correction involves the use of error-correcting codes which are known in the art, such as Reed-Solomon codes.

The use of such error-correcting codes will improve the BER of the WDM system. At present, the BER improvement resulting from the use of forward error-correction known in the art can be calculated using the expression $$BERc = A \times (BERu)^n \quad (2)$$

where BERc is the BER after error-correction, BERu is the BER before error-correction, A and n are constants.

Thus, for example, with a BERu of $10^{-7}$, A=4 and n=2, BERc=$4 \times 10^{-14}$. Accordingly, the use of forward error-correction can improve the BER performance of a lossy channel sufficiently to permit it to be used in a practical WDM system.

Put another way, the BER improvement occasioned by forward error-correction will permit lossier (and hence less expensive) components to be introduced into a practical WDM system.

For the purposes of the present invention, it will be shown below that the scale of BER improvement using forward error-correction is such that performance management using actual BER values before correction can be used to equalize the launching power of transmitters in the WDM system 100.

The forward error-correcting decoding unit 330 generates, in the course of its processing, a code violation every time an error is detected and corrected. These code violations are output to the BER calculation unit 340 along control line 331.

The BER calculation unit 340 is connected at its input to the forward error-correcting decoding unit 330 by control line 331 and at its output to the system manager 160 by control line 164. The BER calculation unit 340 receives code violations from the forward error-correcting unit 330 along control line 331.

The BER calculation unit 340 thereupon calculates, in real time, the BER before forward error-correction using the formula:

$$BER = \text{\# of errors}/(\text{bit rate of channel} \times \text{monitoring time}) \quad (3)$$

Thus, for example, assuming an OC-48 channel having a bit rate of $2.5 \times 10^9$ b/s, which produces 5 errors in 5 minutes of monitoring time, the BER would be $5/(2.5 \times 10^9 \times 5 \times 60)$ or $6.67 \times 10^{-12}$.

The exponential improvement in the BER as a result of forward error-correction permits the calculation of BER on the uncorrected data, for the purposes of adjusting the launching power of each data signal, while at the same time maintaining a performance with appropriately low BER to permit practical use of the channel.

This is amply demonstrated by the following example. Assume a value of A=1, n=2 for the error-correction scheme, and a minimum permissible BER of $10^{-14}$ bit errors/bit, on an OC-48 channel ($2.5 \times 10^9$ b/s bit rate) Without forward error-correction, the BER calculation unit 340, in order to calculate the BER, would require a monitoring time of more than 11 hours ($1/((2.5 \times 10^9 \text{ b/s } 10^{-14} \text{ errors/bit} \times (1/3600)))$) to detect a single bit error (and considerably longer, in order to detect sufficient bit errors as to make the calculation statistically significant).

If, however, forward error-correction is used to achieve a corrected BER of $10^{-14}$ errors/bit, an uncorrected BER of only $10^{-7}$ errors/bit would be required. If the uncorrected data stream were used to calculate the BER (which could then be converted into the corrected BER rate using the known values of A and n), it would only require 0.4 seconds ($100/(2.5 \times 10^9 \text{ b/s} \times 10^{-7} \text{ errors/bit})$) to detect 100 bit errors, which is more than adequate to achieve a statistically significant BER value.

The BER calculation unit 340 forwards the calculated corrected BER rate to the system manager 160, as required. This data is sent to the system manager 160 according to any number of methods well known in the art, whether by an analog signal which is sampled by the system manager 160, by a periodic digital value supplied to the system manager 160, or a digital value calculated and supplied to the system manager 160 upon receipt of a request from the system manager 160.

Figure 4:
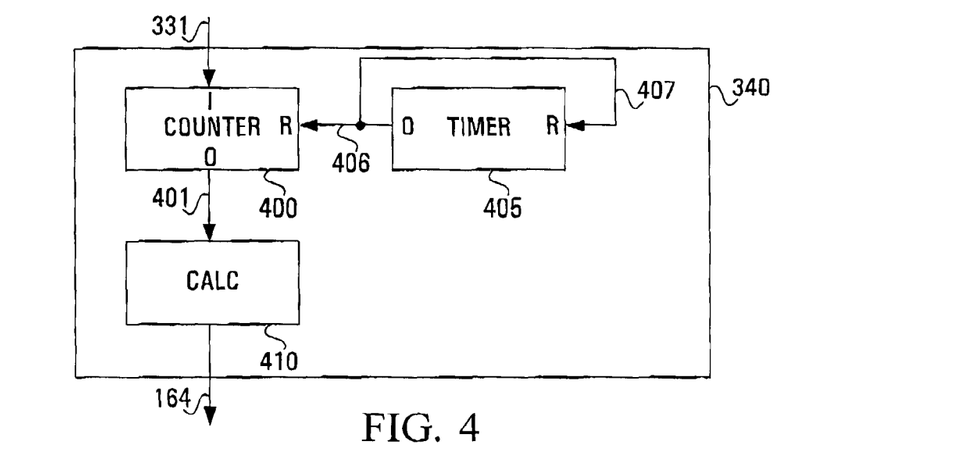
FIG. 4 is a block diagram of the BER calculation unit in the embodiment of FIG. 3 to calculate the BER of the received data stream.

Turning now to FIG. 4, a block diagram of an exemplary system for calculating the BERu of the received data stream and forwarding this data to the system manager 160 is shown.

The BER calculation unit 340 comprises a counter 400, a timer 405 and a calculator 410.

The counter 400 is connected at its input to control line 331 from the forward error-correcting decoding unit 330 and at its output to the calculator 410 by a control line 401. The counter is also connected at its reset by a control line 406 output by timer 405. The output of the timer 405 is also fed back into the reset of the timer by a control line 407. Thus, a continuous period determined by the settings of the timer 405, is used to perpetually reset the counter 400.

The calculator 410 receives, along control line 401, from the output of the counter 400, the total number of code violations that have taken place since the last reset. Using this data, together with the data bit rate of the received data stream, which is known and the period of the timer 405 which is predetermined, it can calculate the BER using the formula set out in equation (3) above.

The calculated BERu value is thereupon output along control line 164 to the system manager 160, as required.

Figure 5:
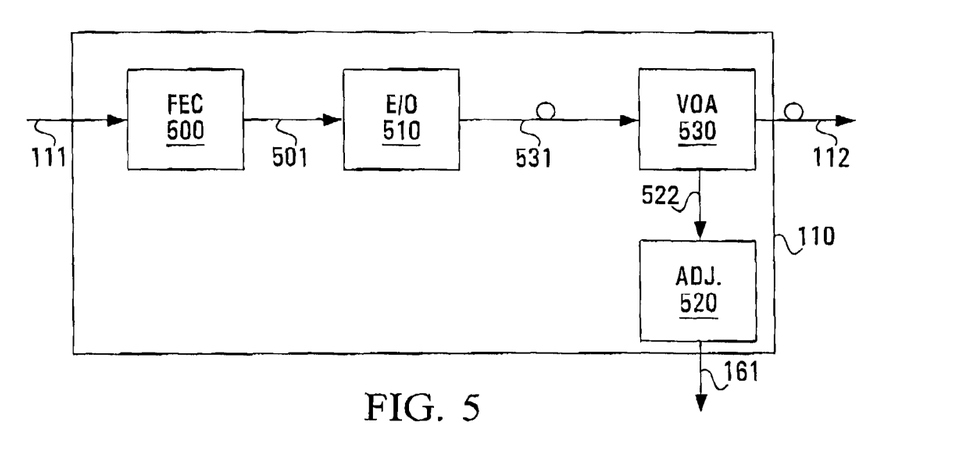
FIG. 5 is a block diagram of a transmitter used in the embodiment of FIG. 1.

Turning now to FIG. 5, a block diagram of the transmitter 110 used in the embodiment of the present invention is shown. The transmitters 113 and 116 would have similar structures. The transmitter 110 comprises a forward error-correcting encoding unit 500, an electrical to optical converter laser diode 510, which may be a laser diode/driver or an MZ modulator, and a launching power adjustment unit 520.

The forward error-correcting encoding unit 500 is connected at its input to the input electrical cable 111. It is connected at its output to the electrical to optical converter 510 by an electrical cable 501. The forward error-correcting encoding unit 500 encodes the data stream which arrives at its input with the chosen error-correcting code in a manner complementary to the decoding performed by the forward error-correcting decoding unit 330 in the receiver 120. The encoded data stream is output by the forward error-correcting encoding unit 500 along the electrical cable 501.

The electrical to optical converter 510 is connected at its input to the output of the forward error-correcting encoding unit 500 by electrical cable 501. It is connected at its output to the output optical fiber 112.

The electrical to optical converter 510 converts the electrical domain signal arriving at its input along electrical cable 501 into an optical domain signal containing the same data, which it outputs along the output optical fiber 112. The function of the electrical to optical converter 510 is entirely conventional.

The launching power adjustment unit 520 is connected at its input to the system manager 160 by the control line 161 associated with the transmitter 110. It is connected at its output to an external variable optical attenuator 530 interposed between the electrical to optical converter 510 and the output optical fiber 112.

The variable optical attenuator 530 attenuates the optical domain signal arriving along optical fiber 531 in accordance with the signals transmitted along the biasing signal line 522 from the launching power adjustment unit 520.

The launching power adjustment unit 520 receives launching power adjustment data along the control line 161, and converts this data into biasing signals which it outputs along biasing signal line 521.

The present invention can be implemented in digital electronic circuitry, or in computer hardware, firmware, software, or in combination thereof. Apparatus of the invention can be implemented in a computer program product tangibly embodied in a machine-readable storage device for execution by a programmable processor; and methods actions can be performed by a programmable processor executing a program of instructions to perform functions of the invention by operating on input data and generating output. The invention can be implemented advantageously in one or more computer programs that are executable on a programmable system including at least one input device, and at least one output device. Each computer program can be implemented in a high-level procedural or object oriented programming language, or in assembly or machine language if desired; and in any case, the language can be a compiled or interpreted language. Suitable processors include, by way of example, both general and specific microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in ASICs (application-specific integrated circuits).

Examples of such types of computers are programmable processing systems contained in the transmitters 110, 113, 116 receivers 120, 123, 126 and system manager 160, shown in FIG. 1, suitable for implementing or performing the apparatus or methods of the invention. The system may comprise a processor, a random access memory, a hard drive controller, and an input/output controller coupled by a processor bus.

It will be apparent to those skilled in this art that various modifications and variations may be made to the embodiments disclosed herein, consistent with the present invention, without departing from the spirit and scope of the present invention.

For instance, the invention may be applicable to other multiplexed communications systems, whether or not in domains other than the optical domain, such as electrical or radio frequency, where the amplifiers used in the communications system have a limited input range.

The invention may be applied to all WDM network architectures, whether point-to-point or optical ring.

Further, the invention may be applicable to adjust the relative performance of individual channels. By using the BER information from the forward error-correcting decoding unit 330, the BER performance can be managed according to the relative importance of the data associated with a particular channel. For example, a channel carrying internet traffic can be set to run at a relatively higher BER, eg. $10^{-9}$, while a channel carrying banking information can run at a much lower BER, eg $10^{-14}$.

Other embodiments consistent with the present invention will become apparent from consideration of the specification and the practice of the invention disclosed therein.

Accordingly, the specification and the embodiments are to be considered exemplary only, with a true scope and spirit of the invention being disclosed by the following claims.

We claim:
1. A method of equalizing performance of a composite channel made up of a plurality of parallel multiplexed transmission channels comprising:
   i) receiving a corresponding parallel plurality of forward error encoded signals from the composite channel;
   ii) determining a first plurality of Bit-Error-Rate (BERu) values for the corresponding parallel plurality of encoded signals received from the composite channel, wherein the first plurality of BERu values is determined prior to an application of forward error correction on any one of the corresponding parallel plurality of forward error encoded signals;
   iii) signalling for individual adjustment of each of a plurality of transmission powers over the plurality of parallel multiplexed transmission channels, respectively, based on the first plurality of BERu values, so as to equalize subsequent pluralities of BERU values; and
   iv) applying forward error correction decoding on each of the corresponding parallel plurality of forward error encoded signals received from the composite channel; and
   v) determining a second plurality of Bit-Error-Rate (BERc) values after the application of forward error correction decoding on each of the corresponding parallel plurality of forward error encoded signals;
   wherein the forward error correction provides an improvement between the first plurality of BERu values and the second plurality of BERc values in a known relation respectively.

2. The method according to claim 1, wherein a type of forward error correction code used is a Reed-Solomon code.

3. A method of equalizing performance of a composite channel made up of a plurality of a parallel multiplexed transmission channels comprising:
   i) setting a respective equalization target for each of the plurality of parallel multiplexed transmission channels;
   ii) determining a respective Bit-Error Rate (BERu) value for each of a plurality of encoded signals received from the plurality of parallel multiplexed transmission channels, wherein the respective BERu values are determined before an application of forward error correction on any of the plurality of encoded signals received from the plurality of parallel multiplexed transmission channels;
   iii) calculating a respective ratio for each of the plurality of encoded signals received, wherein each ratio is a ratio of the respective equalization target to the respective BERu value for a respective one of the plurality of parallel multiplexed transmission channels;
   iv) comparing each ratio so calculated in step iii) to determine whether or not all of the ratios are greater than 1, and
   if all of the ratios are greater than 1 equalization is achieved and the method terminates here;
   but if not,
   v) identifying a worst performing channel as the one of the plurality of parallel multiplexed transmission channels with a lowest ratio calculated in step iii) and
   if the worst performing channel has a ratio greater than 1 reverting to step ii);
   but if not,
   vi) increasing the power of the worst performing channel by a pre-determined amount;
   vii) calculating an updated value of the BERu value for the worst performing channel and an updated ratio of the respective equalization target for the worst performing channel to said updated value of the BERu value; and
   viii) comparing the updated ratio calculated in step vii) to the respective ratio calculated in step iii) for the worst performing channel to determine whether or not said updated ratio is less than said respective ratio calculated in step iii) and
   if said updated ratio is less than said respective ratio calculated in step iii), terminating the method here;
   but if not reverting to step ii).

4. A computer-readable medium storing computer executable program instructions which, when executed by a processor in a receiver in a communications system, causes the receiver to:
   i) set a respective equalization target for each of the plurality of parallel multiplexed transmission channels;
   ii) determine a respective of Bit Error Rate (BERu) value for each of a plurality of encoded signals received from the plurality of parallel multiplexed transmission channels, wherein the respective BERu values are determined before an application of forward error correction on any of the plurality of encoded signals received from the plurality of parallel multiplexed transmission channels;
   iii) calculate a respective ratio for each of the plurality of encoded signals received, wherein each ratio is a ratio of the respective equalization target to the respective BERu value for a respective one of the plurality of parallel multiplexed transmission channels;
   iv) compare each ratio so calculated in step iii) to determine whether or not all of the ratios are greater than 1, and
   if all of the ratios are greater than 1 equalization is achieved and the method terminates here;
   but if not,
   v) identify a worst performing channel as the one of the plurality of parallel multiplexed transmission channels with a lowest ratio calculated in step iii) and
   if the worst performing channel has a ratio greater than 1 reverting to step ii);
   but if not,
   vi) increase the power of the worst performing channel by a pre-determined amount;
   vii) calculate an updated value of the BERu value for the worst performing channel and an updated ratio of the respective equalization target for the worst performing channel to said updated value of the BERu value; and
   viii) compare the updated ratio calculated in step vii) to the respective ratio calculated in step iii) for the worst performing channel to determine whether or not said updated ratio is less than said respective ratio calculated in step iii) and
   if said updated ratio is less than said respective ratio calculated in step iii), terminate the method here;
   but if not revert to step ii).

* * * * *